Dec. 1, 1964  E. L. SCHEIDENHELM  3,158,976
BAT SHIELD FOR HARVESTER REEL
Filed April 29, 1963  2 Sheets-Sheet 1

INVENTOR.
EARL L. SCHEIDENHELM
BY
ATTYS.

Dec. 1, 1964 E. L. SCHEIDENHELM 3,158,976
BAT SHIELD FOR HARVESTER REEL
Filed April 29, 1963 2 Sheets-Sheet 2

INVENTOR.
EARL L. SCHEIDENHELM
BY
ATTYS.

United States Patent Office 3,158,976
Patented Dec. 1, 1964

3,158,976
BAT SHIELD FOR HARVESTER REEL
Earl L. Scheidenhelm, Mendota, Ill., assignor to
Horace D. Hume, Mendota, Ill.
Filed Apr. 29, 1963, Ser. No. 276,345
3 Claims. (Cl. 56—220)

The present invention relates to a novel shield for harvester reels, such as that shown in Patent No. 2,795,921, granted to Horace D. Hume, June 18, 1957. The shield is particularly designed to protect the bat surfaces and to minimize crop damage due to engagement by the bat.

It is a common practice in the harvesting of many crops to utilize a harvester reel having a plurality of transverse wooden bats with or without depending tines. The bat and usual tines are used to engage the crop and to draw it into contact with a cutter bar for harvesting purposes. The present invention is concerned with the application of such a reel construction to crops which are easily subjected to damage by engagement with the bat, and to crops which have abrasive qualities such that the harvesting of the crop results in wear along the bat surfaces. In particular, one such crop is safflower.

It is a first object of this invention to provide a protective shield for existing bats which can be adapted to the existing manufacturing procedures without undue modification of the usual steps involved.

Another object of this invention is to provide a shield which is simple in construction and which can be readily attached to the bat or removed when necessary.

These and further objects will be evident from a study of the attached drawings and the following detailed description.

Figure 1:
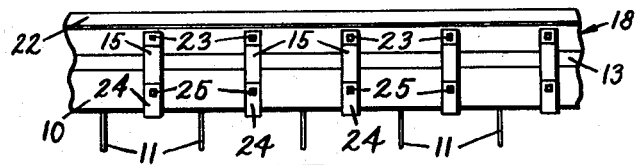
FIGURE 1 is a rear view of a bat assembly, including the shield, constructed according to the present invention.
Figure 2:
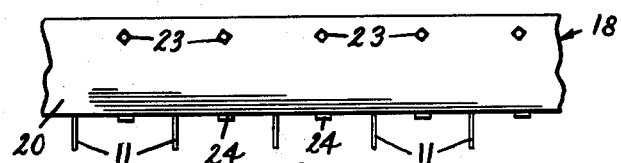
FIGURE 2 is a front view of the bat shown in FIGURE 1.
Figure 3:
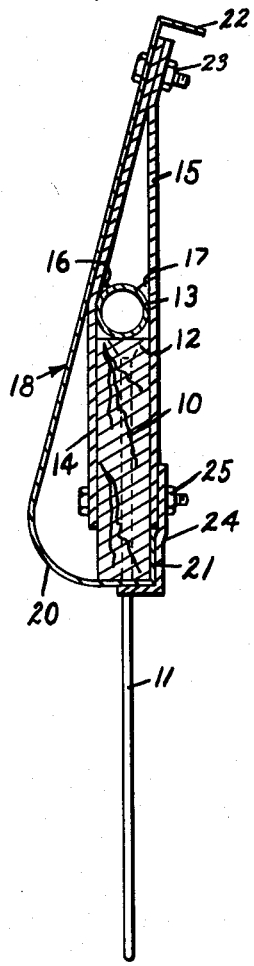
FIGURE 3 is an enlarged vertical sectional view taken along line 3—3 in FIGURE 2.
Figure 4:
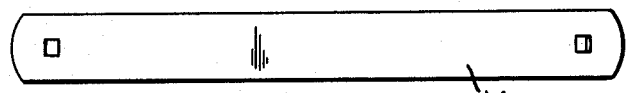
FIGURE 4 is a top view of the front member in the bat clip.
Figure 5:
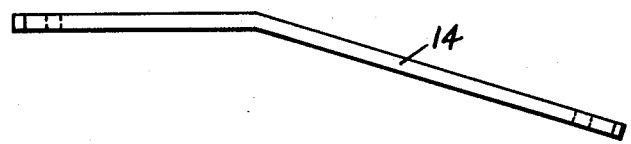
FIGURE 5 is a side view of the member shown in FIGURE 4.
Figure 6:
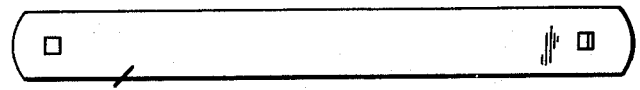
FIGURE 6 is a top view of the rear member of the bat clip.
Figure 7:
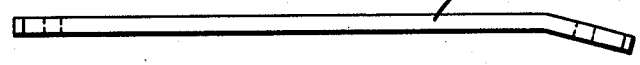
FIGURE 7 is a side view of the member shown in FIGURE 6.
Figure 8:
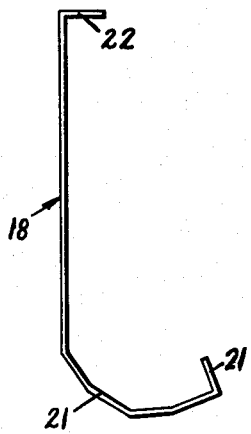
FIGURE 8 is an end view of the fabricated shield.
Figure 9:
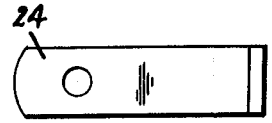
FIGURE 9 is a top view of the shield clip.
Figure 10:
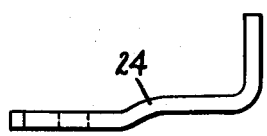
FIGURE 10 is an end view of the clip shown in FIGURE 9.

The present invention provides a simple tear drop shaped shield for a conventional harvester reel. The assembly can best be seen in FIGURES 1, 2 and 3. The normal wooden bat 10 is rectangular in cross section and carries a plurality of longitudinally spaced tines 11, which are inserted within the bat 10, and which have enlarged ends 12 to maintain them in position. The bat 10 is carried by a bat shaft 13 which extends longitudinally along the length of the bat 10 directly adjacent the upper edge thereof. The bat 10 is fixed to the bat shaft 13 by means of a plurality of longitudinally spaced bat clips, each of which comprise a front element 14 and a rear element 15. The shape of each element 14 and 15 is shown in detail in FIGURES 4 through 7. Basically the members 14 and 15 are welded to the bat shaft 13 at points 16 and 17 respectively. The front element 14 has a forwardly facing surface along its upper end which extends upwardly and rearwardly from the front face of bat 10. At their upper ends, the elements 14 and 15 are apertured, as will be described below. Also each of the elements 14 and 15 have coaxial apertures at their lower ends.

The bat shield is generally designated by the numeral 18. The shield, which is preferably manufactured of light gauge metal, has a main portion thereof extending along the forward angular surface of the clip element 14. This main portion of shield 18 extends downwardly and forwardly from the upper edge of the bat 10 and terminates in a curved portion 20 extending rearwardly and covering the lower edge of bat 10. The bat shield is completed by a lower ledge 21 which wraps about the rear surface of bat 10 and a protective upper portion 22.

The shield 18 is fastened to the bat assembly by means of a plurality of upper bolt assemblies 23. The bolt assemblies 23 are received by coaxial apertures in the shield 18 and along the top ends of clip elements 14 and 15. The lower edge of each shield 18 is secured to the bat 10 by means of shield clips 24 which are secured to the bat 10 by means of bolt assemblies 25. The bolt assemblies 25 are received through coaxial apertures in the clip elements 14 and 15, the bat 10 and the shield clip 24. The shield clips 24 therefore clamp the ledge 21 against the bat 10 to prevent motion of the shield relative to the bat 10.

The fabrication of this assembly is quite simple. The various components are first shaped as shown in FIGURES 4 through 10. The elements 14 and 15 of the bat clip are welded to the bat shaft 13 and are positioned on the bat 10 so as to embrace the front and rear sides thereof. The lower ledge 21 of the shield 18 is then fastened to the bat 10 by means of clips 24. The shield 18 includes apertures adapted to receive the tines 11 without interfering with the normal tine construction. The thin shield 18 is then fastened in place along its upper edge by means of bolt assemblies 23. Should replacement of the tine 11 or repair of the bat shaft 13 or bat 10 be necessary, the entire assembly can be reconstructed quite easily.

The construction of this shield provides an effective protective cover for the bat 10 to prevent damage to the bat 10 due to the abrasive quality of certain crops such as safflower. In addition, the gradual tear drop shape of the shield 18 provides a smooth protective surface which minimizes damage to tender crops due to bat engagement. The entire structure of the bat clip and the shield clip is removed from contact with the crop. A continuous, smooth forward surface helps to insure proper crop protection.

Various modifications may occur to one skilled in this art without deviating from the basic concept of this invention. For this reason minor changes and equivalent devices may be substituted without removing the article from the intended scope of this disclosure. Only the following claims are intended to restrict and define the invention disclosed hereby.

Having thus described my invention, I claim:

1. In combination with a harvesting reel bat having a row of crop engaging tines extending downwardly therefrom:

a supporting bat shaft extending longitudinally along the bat adjacent the upper edge thereof;

a plurality of longitudinally spaced bat clips secured to said bat shaft and to the bat;

and a shield extending along the length of the bat and covering the front surface of the bat in the direction of travel of the bat, said shield being provided with a continuous outer smooth surface having a tear drop configuration extending downwardly and forwardly from the upper front edge of the bat and being bent rearwardly over the lower front edge of the bat;

and means on said bat and shield removably fixing the position of said shield relative to said bat.

2. In combination with a harvesting reel bat having a row of tines extending downwardly therefrom:

a bat shaft extending longitudinally along the bat adjacent the upper edge thereof;

a plurality of longitudinally spaced bat clips fixed to said bat shaft and embracing said bat, each of said clips having a front surface facing in the direction of travel of the bat and extending upwardly and rearwardly from the front surface of the bat;

a continuous smooth shield extending along the length of the bat over the front surface thereof; said shield having a portion thereof mounted over the front surfaces of said bat clips and extending downwardly and forwardly therefrom, the lower end of said shield being bent back over the lower bat edge;

and means fixedly connecting said bat clips to the bat and said shield to the bat clips.

3. In combination with a harvesting reel bat having a row of tines extending downwardly therefrom:

a bat shaft extending longitudinally along the bat adjacent the upper edge thereof;

a plurality of longitudinally spaced bat clips fixed to said bat shaft and embracing said bat, each of said clips having a front surface facing in the direction of travel of the bat and extending upwardly and rearwardly from the front surface of the bat;

a continuous smooth shield extending along the length of the bat over the front surface thereof; said shield having a portion thereof mounted over front surfaces of said bat clips and extending downwardly and forwardly therefrom, the lower end of said shield being bent back over the lower bat edge;

means securing said shield to said bat clips along the upper edge of said shield;

and a plurality of longitudinally spaced shield clips fixed to the bat and having portions thereof overlapping the lower edge of said shield adapted to clamp said shield in a fixed position relative to the bat.

References Cited in the file of this patent

UNITED STATES PATENTS

| | | |
|---|---|---|
| 2,840,975 | Koller | July 1, 1958 |
| 2,937,488 | Scheidenhelm | May 24, 1960 |